United States Patent [19]

Goss et al.

[11] 3,909,797

[45] Sept. 30, 1975

[54] DATA PROCESSING SYSTEM UTILIZING CONTROL STORE UNIT AND PUSH DOWN STACK FOR NESTED SUBROUTINES

[75] Inventors: Gary J. Goss, Acton, Mass.; Richard P. Kelly, Nashua, N.H.; Ming T. Miu, Chelmsford, Mass.

[73] Assignee: Honeywell Information Systems Inc., Waltham, Mass.

[22] Filed: Dec. 13, 1973

[21] Appl. No.: 424,390

[52] U.S. Cl. .......... 340/172.5
[51] Int. Cl.[2] .......... G06F 9/12
[58] Field of Search .......... 340/172.5

[56] References Cited

UNITED STATES PATENTS

| | | | |
|---|---|---|---|
| 3,659,272 | 4/1972 | Price et al. | 340/172.5 |
| 3,725,876 | 4/1973 | Hauck | 340/172.5 |

*Primary Examiner*—Leo H. Boudreau
*Attorney, Agent, or Firm*—David A. Frank; Ronald T. Reiling

[57] ABSTRACT

A computer system which facilitates the execution of nested subroutines is disclosed. As each branch transfer is executed by a control store unit, a microcommand initiates the transfer of the return address which has been derived from the present routine to a first hardware register of a push down stack. In addition, the microcommand also pushes down one level the contents of the remaining registers in the stack containing previous return addresses. Thus a sequential return to unfinished subroutines is provided. When the subroutine is completed, a branch code in the address field enables the return address of the previous subroutine to be retrieved from the first hardware register and provided to the current address register for execution. The branch code also restores any other return addresses one level in the stack of hardware registers. In addition to providing for multiple levels of nesting, any number of subroutines may be partially completed since the last operating subroutine is always the first one to be completed.

11 Claims, 4 Drawing Figures

DATA PROCESSING SYSTEM UTILIZING CONTROL STORE UNIT AND PUSH DOWN STACK FOR NESTED SUBROUTINES

BACKGROUND OF THE INVENTION

A. Field of the Invention

This invention relates to data processing systems and more specifically to a control store unit in a data processing system which provides for execution of nested subroutines.

B. Description of the Prior Art

The operations carried out in a data processing system and the order in which they occur are stated by means of a program stored in a memory. To alleviate the programmer's problem of completely specifying each series of operations to be performed and to better utilize the capabilities of a data processor, common functions which may be required several times in one program or may be utilized in other programs are usually provided. Each common function may be specified as a subroutine wherein a subroutine includes a sequence of instructions. Subroutines may be utilized for a number of common functions, for example, trigonometric functions using mathematical approximations. Rather than rewrite the series of operations several times, the programmer merely has to write one set of instructions to perform the operation and call it a number of times. Thus, for a routine requiring a value of a trigonometric function, such as cosine, a branch operation to the cosine subroutine in the digital data processor is executed.

Often times it has been found that one subroutine will call another subroutine in order to complete its operation. When this situation occurs, complications arise since the return address, i.e. the next address from the branching subroutine must be stored and recalled by the data processor. Thus while the efficiency of the overall program is enhanced by providing for a particular function in only one place in the data processor, it is often times found that inefficiencies arise in calling and storing the various subroutines both as to time considerations and hardware and/or space limitations.

In the prior art, a number of solutions for transferring to and from subroutines have been provided. One solution involves the transferral of the next instruction location to the first location of the subroutine. In this design, the last subroutine instruction accesses the first location of the subroutine. This first instruction contains the return address to the next instruction thus enabling the data processor to continue sequencing through the program. This method suffers disadvantages since handling of several common transfers complicates the situation. For example, it is often advantageous to transfer operations froma first subroutine to a second subroutine which utilizes the first subroutine. In other situations, it may be advantageous if the first subroutine recalls itself. These transfers are difficult, and sometimes impossible to achieve with data processing systems of the above types without modification or without increasing the number of instructions. When the first subroutine is called for a first time, the operating address is transferred to the first subroutine location. When the first subroutine is recalled by an intermediate routine, the existing contents are transferred to the same location in the subroutine thus destroying the original contents. As a result, while the operating program can return to the intermediate routine, it cannot return to the main routine.

In data processing systems which permit a first or second subroutine to recall the first subroutine, an instruction may be provided to move the return address to a specified storage location. The last subroutine instruction is then altered so as to include the address of the specified storage location. Although this system permits one subroutine to call another subroutine, i.e. to have the latter subroutine nest, and permit a partially completed subroutine to be subsequently used for other purposes, one reserve memory location and several instructions are required for each nesting level. Increasing the number of these memory locations for each nested subroutine increases the complexity of the control circuitry. In addition, programming complexity is increased because the last subroutine instruction must be modified to address the proper memory location for each subroutine. Therefore, this approach becomes more cumbersome as the number of nesting levels are increased.

Another type of data processing system utilizes vacant locations in memory for storing the return addresses of the subroutine or routine previously executed. The last instruction of the subroutine branches to a designated memory location. In order to exploit this system, however, two registers, one a pointer to the vacant memory locations and another which provides for the current value of the register and the memory address, are required. While this type of data processing unit overcomes some of the previous problems, it still results in supplemental instructions to indicate each new level of subroutines with a concurrent greater execution time required.

C. Objects of the Invention

Accordingly, it is a primary object of this invention to provide an improved data processing system wherein subroutine transfers are expedited.

It is another object of this invention to provide a new and improved system for storing return addresses of branching subroutines and for automatically enabling a return address to call the branched subroutine when completed.

It is a further object of the invention to provide an improved technique for employing nested subroutines for use in data processing and computing systems which technique is efficient, reliable and results in overall time saving.

SUMMARY OF THE INVENTION

The foregoing objects are achieved according to one embodiment of the invention and according to one mode of operation thereof, by providing in a data processing system, a control store unit which enables the sequencing of the central processing subsystem. The control store unit provides a branching microinstruction to the subroutine via a microcommand for enabling the return address of the current operating routine to be stored. The microcommand also enables a push down stack such that previously stored return addresses are removed one level. Upon completion of the subroutine, the control store unit provides a branch field for enabling a multiplexer to select the return address contained in the push down stack and provide it to the current address register in the system. The branch field also raises one level the previously stored return addresses in the push down stack.

BRIEF DESCRIPTION OF THE DRAWINGS

The novel features which are characteristic of this invention are set forth with particularity in the appended claims. The invention itself, however, both as to its organization and operation together with further objects and advantages thereof may best be understood by reference to the following description taken in connection with the accompanying drawings in which:

DETAILED DESCRIPTION OF THE PREFERRED EMBODIMENT

Figure 1:
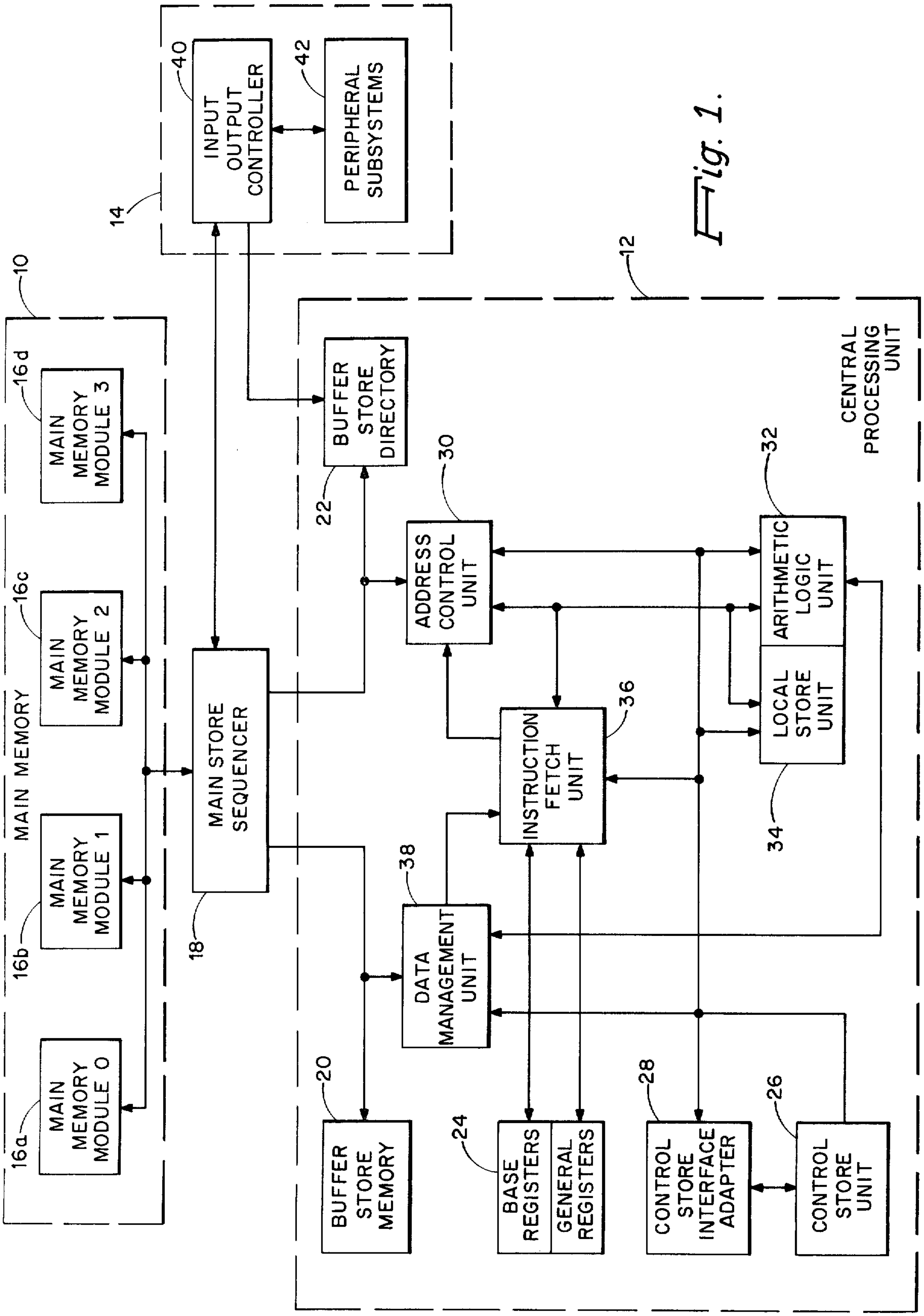
FIG. 1 is a general block diagram of a data processing system utilizing the present invention.

Prior to describing the structure and operation of the invention in conjunction with the drawings, it is to be noted that for convenience of explanation, the embodiment depicted in the drawing is shown to be capable of four subroutine levels. However, it is of course realized that in actual practice the number of subroutine levels may be much more than four with an appropriate increase in the hardware which is employed. Alternatively, rather than effecting an enlargement of the hardware, an overflow procedure may be employed. In the latter situation, in the event that it were desired to employ the number of subroutine levels in excess of four, the data processing system could revert to other implemented mechanisms for handling subroutines in excess of four.

The implementation of the embodiment described in the drawings is effected with a given arrangement of circuitry. However, it is understood that other logic arrangements may be employed in carrying out the invention to adapt the invention to various types of data processors. Accordingly, it is not intended to be limited to the specific schemes shown in the drawing.

Referring now to the drawings, FIG. 1 illustrates the overall system in which the nested subroutine implementation of the present invention may be used. More particularly, FIG. 1 shows a main memory subsystem 10, a central processor subsystem 12 and an Input-Output subsystem 14. The main memory subsystem 10 consists of four metal oxide semiconductor modules 16*a* to 16*d*. The four modules are interfaced to the central processor subsystem 12 and the peripheral subsystems 14 via a main store sequencer 18. The main store sequencer 18 gives the capability of providing access to and control of all four memory modules.

The central processing subsystem 12 executes word oriented instructions that operate on variable length fields. The basic unit of information in the central processor is a nine bit byte consisting of eight data bits and one parity bit. These bytes of information are used in groups of two (half word), four (word), or eight (double word) for instructions or fixed or floating point operands. Bytes are also used in variable length fields as decimal or alphanumeric data.

Located within the subsystem 12 is a buffer store memory 20. The buffer store memory contains a number of uniquely addressable blocks or pages of recently accessed information from main memory 16. The buffer memory is based on the concept that small areas of main memory receive a high percentage of usage in a given period of time. Thus, a small, high speed buffer memory that contains main memory information and is accessable to the central processing unit can decrease the average memory access time.

Whether a given page of information is contained in the buffer store memory 20 can be determined only by examining the contents of the buffer store directory 22. The buffer store directory is provided to reference the contents of the buffer memory 20 to the contents of main memory 16 and is logically divided such that instead of blocks of information as are contained in the buffer store memory 20, each column in the buffer store directory contains the main memory row address of the corresponding information in the buffer store. By accessing the buffer directory 22 with a column number and comparing the requested row number with the row number contained in the buffer directory, the central processing subsystem 12 can determine whether a given page of information is contained in the buffer store memory 20.

The buffer store memory 20 is transparent to software, i.e. in a given memory access, the program cannot determine whether the information has been fetched from buffer memory 20 or from main memory 16. In each memory read operation, both the buffer memory 20 and the main memory 16 are accessed; if the information is contained in the buffer memory, the main memory read operation is aborted and the information is fetched from the buffer memory. If the information is not contained in the buffer memory 20, the main memory read operation continues and the information is delivered from main memory 16.

The central processing unit contains a plurality of registers indicated as 24. These may include general registers, some of which may be used as index registers, base registers used for address development, scientific registers for special applications, an instruction counter register, a status register, and a T-register used for program control. These registers 24 store information which may be used by the following units.

Detailed operation of the central processing subsystem 12 of FIG. 1 is controlled by a memory in control store unit 26. Each location in control store memory can be interpreted as controlling one machine cycle. As each location of the control store memory is read, its contents are decoded resulting in a specific operation within the central processing subsystem. (For a more complete discussion of microinstruction decoding see "Digital Computer Design Fundamentals" by Yaohan Chu published by McGraw-Hill Company). By grouping locations, control store sequences are obtained that can perform a specific operation or instruction. As each instruction is initiated by the subsystem, certain bits within the operation code of the instruction are used to determine the control store starting sequence. Testing of certain flip-flops which are set or reset by instruction decode functions allow the control store memory to branch to a more specific sequence when necessary. (Typical control store units for implementing the present invention are found in a book called *Mi-*

*Microprogramming: Principles and Practice* by Samuel S. Husson, published 1970 by Prentice Hall, Inc.).

Coupled to control store 26 is control store interface adapter 28 which contains all logic necessary for directing the operation of the control store memory. This includes logic for control store address modification, testing, error checking, and hardware address generation. Hardware address generation is used for developing the starting addresses of error sequences or the initializing sequence.

Control store interface adapter 28 is coupled to address control unit 30 which is responsible for all address development in the central processor subsystem. All operations of the address control unit, including transfers to, from and within the unit, are directed by control store 26 micro-operations and logic within the unit. The normal cycling of the address control unit 30 depends on the types of addresses in the instruction rather than the type of instruction. Thus, depending on the address type, the address control unit 30 may perform different operations for each address and instruction.

Coupled to the address control unit 30 is an arithmetic logic unit 32. Its primary function is to perform the arithmetic operation and data manipulations required of the data processor. The arithmetic logic unit is a primary work area of the data processor. The operations of the arithmetic lgoic unit are completely dependent on control store micro-operations as generated by control store unit 26. Address control unit communicates also with the buffer store directory 22, main store sequencer 18, arithmetic and logic unit 32 and control store unit 26 via control store interface adapter 28.

Also connected to address control unit 30 is the local store unit 34. The local store unit is used to store and maintain ability information. In addition, the unit contains working locations which are primarily used for temporary storage of operands and partial results during data manipulation of the arithmetic and logic unit 32.

Also coupled to address control unit 30 is an instruction fetch unit 36 which has the responsibility of keeping the central processing subsystem supplied with instructions. The unit operates under control of control store unit 26 such that the next instruction is perfetched by means of normally unused memory cycles and has available in its registers the next instruction before completion of the present instruction. To provide this capability, the instruction fetch unit contains a 12 byte instruction register that normally contains more than one instruction. In addition, the instruction fetch unit decodes each instruction and informs the other units of the instructions length and format.

A data management unit 38 is coupled to the instruction fetch unit 36 and provides the interface between main memory 16 and buffer memory 20. It is the responsibility of the data management unit 38 to recognize which memory unit, i.e. either 16 or 20, contains the information desired and to strobe the information into appropriate registers of the previously mentioned units at the proper time. The data management unit also performs masking operations used during partial write operations.

Connected to main store sequencer 18 is an input/output controller 40. The input/output controller is that portion of the Input/Output subsystem which completes a data path from a number of peripheral subsystems 42 to main memory 16. Controller 40 provides a path through which the peripheral commands are initiated, in addition to controlling resulting data transfers.

Figure 2:
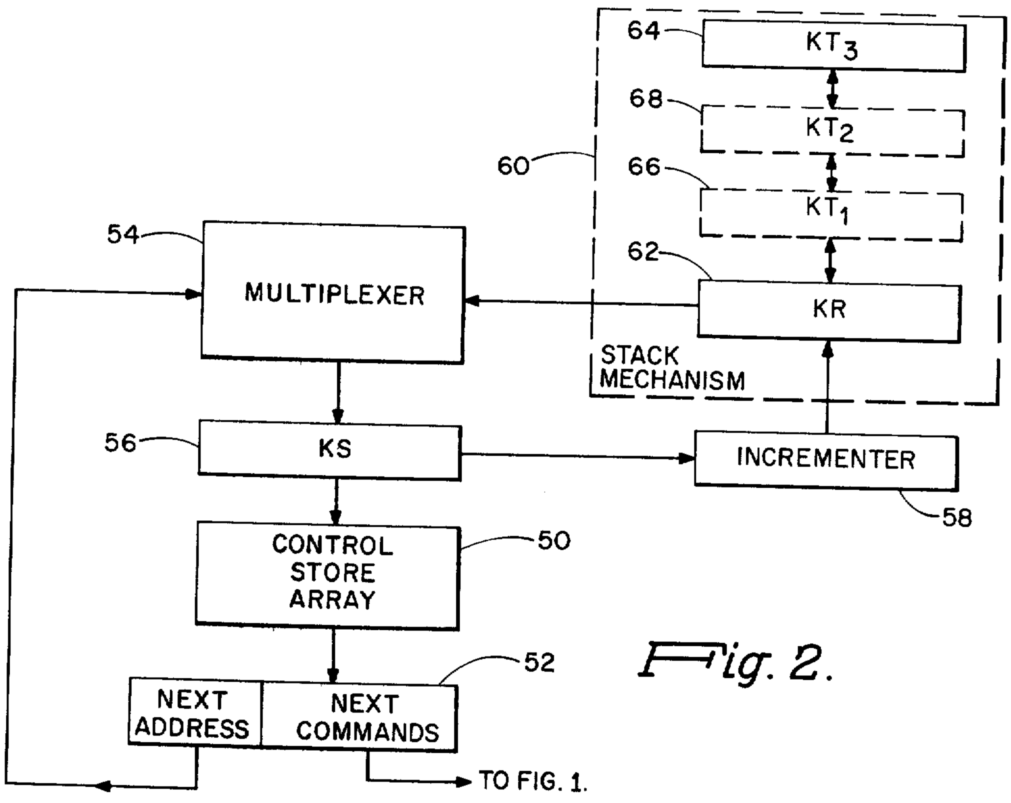
FIG. 2 is a block diagram of a portion of a control store unit of the data processing system which carries out the principles of the present invention.

Referring now more specifically to FIG. 2 control store unit 26 of FIG. 1 is shown in greater detail. Control store unit 26 contains additional logic and circuitry, but for the purposes of the invention, the logic has been limited to that shown in FIG. 2. Control store unit 26 includes a control store array 50. Control store array may be a read only memory, ROM, or a random access memory, RAM, or any other form of memory device. The control store unit contains the microinstructions or control words which are transmitted throughout the central processing subsystem to control the operation of the various units of the central processor. These controlled units include the instruction fetch unit 36, data management unit 38, arithmetic and logic unit 32, and address control unit 30. For each machine cycle, a control word is fetched out of control store array 50. Control store array 50 is initialized by thet instruction fetch unit 36 which decodes the operation code and transfers the current address of the instruction to be executed to the control store array 50.

Control store array 50 is coupled to an output register 52 which receives the microinstruction generated by control store array 50. This microninstruction contains a next address portion and a next command portion. The next address portion in each control word identifies the next address to be accessed.

The next address output of control store array 50 is contained in a predetermined number of bits, for example 26 bits. This address may be further broken down into a number of fields which comprise each microinstruction. Thus, for example, the next address portion of the microinstruction may be visualized as comprising six fields. One field, hereinafter referred to as an E field, is a branch control field which serves to specify the type of branch to be taken. The E field may be a three bit field used as the sequence control field while eight possible branches are possible because of the three bit field, only two are discussed for purposes of this invention. The next address portion of the microinstruction also contains A, B, C, D and L fields which are used for generating branch addresses. The A field may be used to generate an absolute base address for certain E fields and would be, for example, six bits long. The B field which may be four bits long would be used with the A field to generate a base address for predetermined E fields and with other E fields would be used as a test field providing a logical AND mask for a test bus (not shown). The C field is six bits long and is used with certain E fields to select one out of 64 different tests (not shown). The D field is also six bits long and is also used with certain E fields to select one out of sixty-four different tests (not shown). The L field is one bit long and is used to specify the value of the low order address bit for certain E type branches. One example of how these fields interrelate to provide the next address would be as follows. For a conditional and/or unconditional branch specified in the E field, the branch would be made to a base address which is modified based on the results of the testing done by the C and D fields. The base address would be equal to the values of the A and B fields and one bit each from the test result of the C and D fields. The L bit would provide the twelfth address bit in the next address. (Control store units typical of the one which may be utilized herein are described in U.S. Pat. No. 3,634,833 issued to Leonard L. Kreidermacher, Jan. 11, 1972 and U.S. Pat. No. 3,560,993 issued to Scott Schwartz, Feb. 2, 1972 both assigned to the same assignee as this invention).

The next command field in the microinstruction may be for example 70 bits long and is used to generate commands for the data processor. The command field is made up of a number of subfields which are cabled to each functional unit where commands are generated. One command subfield, KRFSIO, provides a microcommand which enables storing of the return address. For purposes of illustration this command subfield is shown as a three bit field immediately following the next address portion of the next microinstruction.

The E field in output register 52 enables a multiplexer 54 to seelect the address to be delivered to next address register 56. Multiplexer 54 has coupled to it eight inputs each one providing an address to next address register 56. Thus, multiplexer 54 selects one of eight inputs depending on the three bit E field provided in the next address field to output register 52. This multiplexer may be, for example, an eight channel digital switch made by Fairchild and described in Fairchild Semiconductor Circuit Data Catalog 1970 by Schwerber under the description DM7210/DM8210 on page 95.

The output of multiplexer 54 is provided to current address register 56 which in turn provides to the control store array 50 the address of the next microinstruction to be executed. Address register 56 is also coupled to an incrementer 58 which increments by a predetermined number, e.g. by one, the address contained in next address register 56. Incrementer 58 may be any well known logic which increments a given number and is widely used in the prior art. Incrementer 58 transfers to stack mechanism 60 the address from current address register 56 when one subfield of the next command field N of output register 52 provides KRFSIO microcommand. This microcommand enables the storing of the return address of the operating routine.

In response to the KRFSIO microcommand, incrementer 58 provides the incremented current address to a stack mechanism 60 which includes a plurality of hardware registers 62, 64 and shown in phantom 66 and 68. Functionally, stack mechanism 60 is a push down storage device which comprises a plurality of work registers arrayed in a column with only the register at the top, i.e. register 62, of the column connected to the rest of the system. When words are serially entered into the stack mechanism 60, each word enters, in turn, the top register of the column and the remaining words are pushed down the column from register to register. As a word is removed from the list (popped up), it is provided by the top register 62 to multiplexer 54 and each other word stored in stack 60 moves up one hardware register in the column. The registers can be visualized as a deck of cards wherein access to the cards of the deck is only possible by adding or removing cards, one at a time, to or from the top of the deck.

Push down stack 60 thus stores the incremented current addresses as provided from current address register 56. These incremented addresses represent the next step of the routine which would have been executed except for the branch to the subroutine. Since these addresses will be stored when a branch to a subroutine occcurs, the addresses in push down stack 60 will, upon the execution of the last subroutine instruction, return the program to the proper sequence. This can be better illustrated by reference to FIG. 3.

Figure 3:
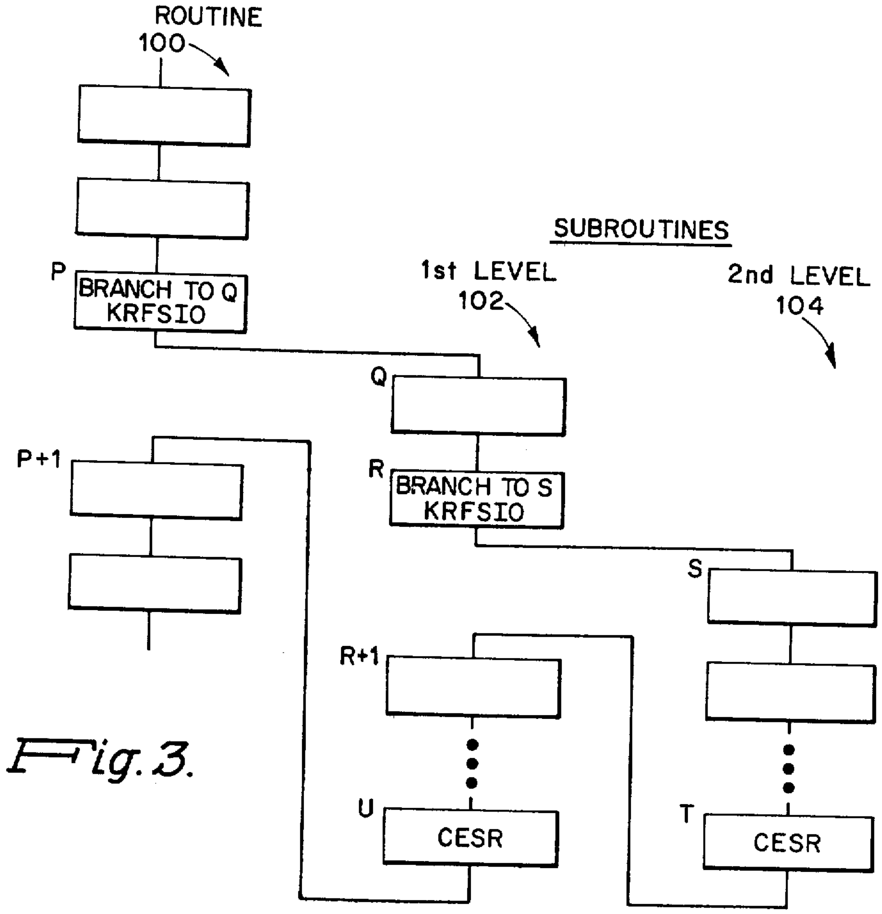
FIG. 3 illustrates a flow diagram of the execution of the instructions of a program from a routine to two subroutines in accordance with the present invention; and, FIG. 4 is a logic block diagram of circuitry utilized in the control store unit of FIG. 2 in accordance with the present invention.

In FIG. 3 is a microinstruction sequence which forms the routine in a computer is indicated by 100. A routine may itself be a main routine or a subroutine and is any common sequence of instructions designed to perform a function. It is desired to be able to perform branches to any common sequence of microinstructions. For exemplary purposes, two subroutines indicated at 102 for a first level subroutine and 104 for a second level subroutine, are shown. These subroutines may occur anywhere in the routine. In FIG. 3 the rectangular boxes in the program indicate microinstructions. The contents of a microinstruction is indicated by the output of control store array 50 to output register 52.

The microinstruction which determines the jump to the subprogram is found at microinstruction P. This microinstruction consists of a next address field having an E field of a predetermined value which indicates a conditional or unconditional branch and a next command field having a three bit microcommand field KRFSIO whichh stores the return address simultaneously with a branch to the subprogram. This KRFSIO microcommand is shown in rectangular box P. When this microinstruction is reached during the sequencing of the routine, the following operations occur. The E field of the next address has a first value which indicates that a branch operation is to be performed. The next command field in register 52 has a KRFSIO subcommand field which indicates the current address in register 56 should be stored. This is accomplished by transferring the contents of incrementer 58 which adds to the current address contained in rectangular box P a predetermined number, such as one, to stack 60. This address P+1 is then stored in register 62.

Subsequent to the occurrence of the branch, as shown at Q, normal sequencing of the subroutine occurs. If the first level subroutine requires another subroutine or a reference to another subroutine as shown by rectangular box R, then another branch to a subroutine is executed. Thus the same steps as occurred at step P will be applicable to step R. The current address is transferred from register 56 to stack 60 via incrementer 58 under the subcommand KRFSIO such that the address R+1 is stored in register 62. The previously stored address is then pushed down to register 66. The branch command as provided by the E field having a first value enables a branch to rectangular box S.

When the last microinstruction of the subroutine occurs, the E branch field of the address indicates that the return address to the previous subroutine should be obtained. This E branch field having a second value which is different from the first value as shown at T enables multiplexer 54 to select the addres contents of register 62 and provide this address to current address register 56. In this way, a return to the first level subroutine at the position R+1, a shown in the rectangular box, is provided. The E field having the second value also restores, i.e. "pops up", the contents of the push down stack 60. Thus the contents in register 66 are now contained in register 62.

The first level subroutine is then executed until rectangular box U is reached, U being the last microinstruction of the first level subroutine. Again, this microinstruction provides an E branch field having a second value such that multiplexer 54 selects the contents of register 62 to be fed to current address register 56. The contents of register 62, when the branch from the second subroutine was executed, are the previous contents of register 66. The E field in addition to transferring the contents from register 62 also "pops up" one level the push down stack 60. Since no usable address is contained in register 66, register 62 does not indicate a current address if addressed again. Upon execution of the first level branch return microinstruction, the instruction as shown in P+1 would be executed and the routine would then be entered at the next location.

Figure 4:
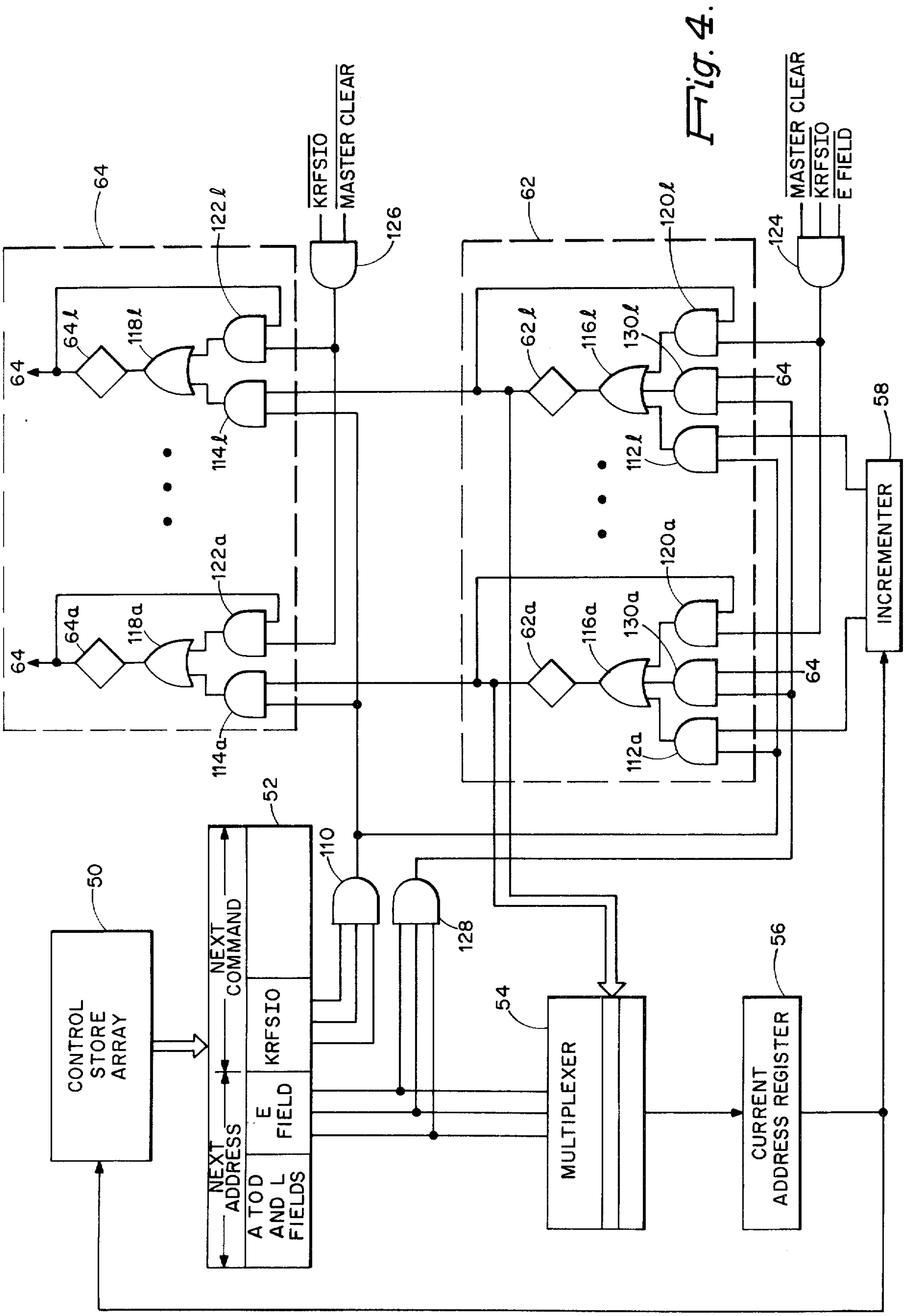

Referring now to the detailed circuitry shown in FIG. 4, the same reference numerals used previously are shown in addition to the detailed circuitry required for operation of the hardware mechanisms. In FIG. 4, only two hardware registers 62 and 64 are shown. Register 62 represents the top of the stack and register 64 represents the bottom of the stack. Since the same control circuitry required for registers 66 and 68 is shown by register 62, they have been omitted from the drawing. The bottom register 64 does not push down the address to a lower level and hence is not responsive to the circuitry as registers 62, 66, 68 would be. Since register 64 provides a different operation than registers 62, 66 and 68, it has been shown in detail.

Registers 62 and 64 are shown as a plurality of flip-flops, 62*a* – 621 and 64*a* – 641, respectively, which store successively the return addresses provided by incrementer 58. These flip-flips may be any of those binary storage devices well known in the art.

FIG. 4 shows the control store array 50 which stores the microinstructions to be executed by the various units which comprise the central processing system. during a cycle of operation, the control store array 50 is addressed by the contents of the current address register 56. This causes the contents of the location specified by the address to be read into an output register 52.

Fields of the word containing the next address to be accessed and next commands to control the central processor subsystem are transferred and decoded by each of the functioinal units as described in FIG. 1. These units would include the instruction fetch unit 36, the data management unit 38, the arithmetic and logic unit 32, and the address control unit 30. Each functional unit includes logic circuits for decoding the requisite subcommands specified by the control word under control of the system timing operations.

When the routine 100 calls a subroutine 102, the following sequence occurs. The branch word is read out and branching of the control store array 50 takes place in the cycle following the read-out and is developed from the E field having a first value of the control store branching mechanism. The branch word also has a microcommand KRFSIO which stores the return address of the routine. More specifically, the microcommand field KRFSIO in register 52 will be decoded by AND gate 110. The output of AND gate 110 is coupled to AND gates 112*a* – 1121 and 114*a* – 1141 which are connected as inputs to registers 62 and 64, respectively. AND gates 112 and 114 are also coupled to current address register 56 via incrementer 58 and register 62, respectively, and when enabled transfer the return address each holds.

When microinstruction P is executed, three transfers will occur. First, the next address i.e. the address resident in register 52 is transferred through multiplexer 54 to the current address register 56. This address has an E field having a first value which enables the multiplexer 54 to select the contents of register 52. Second, AND gate 110 enables AND gates 112 such that the current address which is being simultaneously forced out of current address register 56 is provided to register 62 via incrementer 58. This incremented address is the return address for the temporarily discontinued routine. Thus, the previously resident address, i.e. the current address just executed, in address register 56 is fed to register 62 while the new branch address is transferred into current address register 56. This is accomplished via OR gate 116*a* – 1161 transferring the signal from AND gates 112 to flip-flops 62*a* – 621. As a result, address register 62 contains the return address which must be executed when the routine is restored. Third, the output of the KRFSIO microcommand is fed to AND gates 114*a* – 1141 thus transferring the address stored in register 62 to the address register 64 via OR gates 118*a* – 1181. When branching at the first level subroutine, this address is meaningless.

At this time, the first level of the subroutine, i.e step Q as shown in FIG. 3, is ready to be executed. When step R occurs, the same operations as occurred for step P will be enabled. Thus, AND gate 110 is enabled transferring the contents of current address register 56 into register 62 via incrementer 58, AND gates 112*a* – 1121 and OR gates 116*a* – 1161, and simultaneously transferring the contents of register 62 into register 64 via AND gates 114*a* – 1141 and OR gates 118*a* – 1181. Thus at this point in time, the return address for the routine will be stored in register 64 and the return address for the first level subroutine will be stored in register 62.

When step S of FIG. 3 is executed, the contents contained in registers 62 and 64 will remain unchanged. This is shown by AND gates 120*a* – 1201 and AND gates 122*a* – 1221. AND gate 120 has as one input coupled to the output of register 62 and its other input coupled to a hold signal. The hold signal is derived from AND gate 124 which has three inputs. These inputs are signals representing the absence of master clear, the absence of the branch microcommand KRFSIO, and the absence of the E field branch command having the first predetermined value. Since none of these signals are being generated, the value stored in register 62 is returned.

Register 65 also holds the same value it stored. This is accomplished by AND gates 122*a* – 1221 which have one input coupled to the output of register 64 and a second input from an AND gate 126 which provides the hold signal. AND gate 126 has two input signals which are the absence of the master clear and the absence of the E field branch microcommand having the first predetermined value. If neither of these signals occur, register 64 restores its current contents. In the preferred embodiment, register 64 is the last register in the push down stack 60.

At step T in FIG. 3, the last microinstruction in the second subroutine is executed. This microinstruction provides an E field having a second value enabling a return from the subroutine. This E field is decoded by multiplexer 54 and also by AND gate 128. When the E field branch is initiated, two simultaneous operations occur. First, multiplexer 54 is enabled such that it transfers the return address as contained in register 62 to register 56. This address is the R+1 address as shown in FIG. 3. Simultaneously AND gate 128 enables AND gates 130a – 1301 such that the output of the register of the next lower level is transferred to the next higher level register. AND gates 130a – 1301 have as their second input the contents of the register immediately lower in the push down stack 60. In the example shown, the contents of register 64 which contain the next address in the routine are transferred to register 62.

When step U is reached, another return branch to the previous subroutine will be generated by the E field having the second value. Thus the address currently in register 62 will be transferred by multiplexer 54 to current address register 56. There will also be a transfer of return address in register 64 to register 62. However this address is meaningless. The return address stored in register 56 contains the next instruction in the routine as shown by the rectangular box P+1 in FIG. 3. In this example, the routine is then completed.

In acutal practice, there will be several registers 62 in the system which would have the same control signals for each of the flip-flops contained within the register. There will only be one register 64 since this represents the bottom of the stack and does not require a pop up command as shown by AND gates 130.

While a preferred embodiment has been described, other modifications will be readily suggested to those of ordinary skill in the art. For example, the possibility of a two way return from a subroutine can be easily implemented. If a subroutine defined a particular test, the result of which may return to one of two different places in the routine, both return points could be stored in the push down stack. Upon completion of the last instruction, if a favorable test indicates that the first return point is to be utilized, then the address in register 62 would be transferred to register 56. If the results of the test are unfavorable, the address from register 62 could be popped up but not placed into register 56 with a simultaneous transfer of the address in registers 64 and 62. Since the second test would be favorable, the address now stored in register 62 would then be transferred to current address register 56 and sequence control store array 50.

Another example would be where one subroutine could execute a series of subroutines. Under this situation a simultaneous exchange of the contents of registers 56 and 52 could be effected by having the microcommand field KRFSIO and the E branch field having the first value executed simultaneously. Thus the address contained in register 62 would be transferred to register 56 via multiplexer 54 under the E field branch and the address in register 56 would be transferred to the register 62 via incrementer 58 under the microcommand field KRFSIO. Further modifications will suggest themselves to those of skill in the art.

It should be noted that the branch field to the subroutine can be entered with either a conditional or unconditional branch. This is especially advantageous with the system described since the next address is continuously provided by the control store array 50. Nonetheless, it would be equally as applicable in those situations where a sequence counter is used. Both situations still requie the utilization of the KRFSIO subcommands which enable the storing of the next address from the routine being temporarily discontinued.

Although it has been shown, described and pointed out the fundamental novel features of the invention applied to the preferred embodiment, it is understood that various omissions, substitutions and changes in the forms and details of the device illustrated and its operation may be made by those skilled in the art without departing from the spirit of the invention. It is the intention, therefore, to be limited only as indicated by the scope of the following claims.

What is claimed is:

1. A method for effecting transfers to and from routines and subroutines comprising the steps of:
   generating a first microinstruction from a control store memory which identifies a branch to subroutines, and
   executing a branch to a subroutine, said branch executing step including:
   transferring the present executed address in a present address register to an incrementer,
   incrementing said present address by a predetermined number,
   storing said incremented address which is a return address in a first register of push-down stack,
   transferring previous return addresses into adjacent registers in said push-down stack simultaneous with the storing of said incremented address,
   transferring the address in said first microinstruction to said present address register;
   generating a microinstruction from said control store memory which identifies a return branch from said subroutines, and
   executing a return branch from said subroutines, said return executing step including:
      transferring the return address from said first register in said push-down stack to said present register,
      transferring previous return addresses into said adjacent registers in said push-down stack simultaneous with said transferring said return address to said present address register.

2. The method as defined in claim 1 wherein said step of executing a branch to a subroutine is repeated several times before said executing of a return branch occurs.

3. The method as defined in claim 1 wherein the step of executing a branch to a subroutine includes the step of:
   enabling a multiplexer by one address field of said microinstruction generated from said control store unit having a first value to select the next current address from said generated microinstruction, and
   the step of executing a return branch from the subroutine includes:
      enabling a multiplexer by said one address field of said microinstruction generated from said control store unit having a second value to select the return address in said first register of said push down stack.

4. A data processing system for executing a routine which accesses a plurality of subroutines, said system comprising:
   means for providing a sequence of microinstructions, each microinstruction containing address fields to define an address of a microinstruction of said providing means, and command fields to define transfer paths, one type of said microinstruction specifying a branch to said subroutines and a second type of said microinstructions specifying a return from said subroutines;
   storing means including:

a plurality of registers serially intercoupled, one of said plurality of registers being a first end, another of said plurality of registers being a second end, the remaining of said plurality of registers being intermediate said first and said second end, each of said plurality of registers being adapted to hold one return address, first means coupled to said one and said remaining registers and responsive to said providing means for serially propagating the return addresses to said second end of said plurality of registers and, second means coupled to said second end and said remaining registers and responsive to said providing means for serially propagating the return addresses to said first end of said plurality of registers, wherein said storing means is responsive to said one type of microinstruction for sequentially storing return addresses of previous routines and subroutines in said one register; and means responsive to a series of said second type microinstruction for sequentially transferring to said providing means from said one register of said storing means in a reverse order said return addresses.

5. A system as defined in claim 4 wherein one of said address fields of said providing means has a first value for enabling said storing means to receive said return addresses from said transferring means and a second value for enabling said storing means to deliver said return addresses to said transferring means.

6. A system as defined in claim 5 and further including:

means for incrementing said address of said providing means by a predetermined number, and wherein said one register receives said incremented address from said incrementer means in response to said one command field.

7. A data processing system for sequentially accessing routines and subroutines, said system comprising:

means for providing a sequence of microinstructions, each microinstruction containing address fields to define a next address of a microinstruction of said providing means and command fields to define transfer paths, one of said address fields having a first value which specifies a branch from said subroutines and a second value which specifies a return to said subroutines, one of said command fields specifying a transfer of return addresses;

means for receiving an address from said providing means, said address in said receiving means being a present address;

storing means including:

a plurality of registers serially intercoupled, one of said plurality of registers being a first end, another of said plurality of registers being a second end, the remaining of said plurality of registers being intermediate said first and said second end, each of said plurality of registers being adapted to hold one return address, first means coupled to said one and said remaining registers and responsive to said one address field having a first value of said providing means for serially propagating the return addresses to said second end of said plurality of registers, second means coupled to said second end and said remaining registers and responsive to said one address field having a second value for serially propagating the return addresses to said first end of said plurality of registers, said one register receiving said return address in response to said one address field having a first value and to said one command field; and means responsive to said one address field having said second value for transferring the return address from said one register to said receiving means, said return address becoming said present address.

8. A system as defined in claim 7 and further including:

incrementer means coupled to said receiving means for incrementing by a predetermined number said present address, said one command field enabling said incremented present address to be transferred to said one register, said incremented address being a return address.

9. A system as defined in claim 7 wherein said storing means further includes:

first means responsive to the absence of said one command field, said one address field having a first value and a master clear signal for holding said return addresses contained in said one and said remaining registers of said plurality of registers, and second means responsive to the absence of said command field and said master clear signal for holding the contents of said return addresses in said another and said remaining registers.

10. A system as defined in claim 9 wherein said providing means includes:

an output register coupled to said storing means for receiving said next address fields and said next command fields, first decoding means coupled to said output register and responsive to said one command field for enabling said first means, and second decoding means coupled to said output register and responsive to said one address field having the second value for enabling said second means.

11. A system as defined in claim 10 wherein said one address field having a first value and said one command field is provided in a microinstruction branching from said subroutines and wherein said one address field having the second value is provided in said last microinstruction of said subroutines.

* * * * *